United States Patent
Borenstein et al.

(10) Patent No.: US 7,437,314 B2
(45) Date of Patent: Oct. 14, 2008

(54) METHOD AND SYSTEM FOR REFERENCING TRADING AGREEMENTS

(75) Inventors: Howard Borenstein, Downsview (CA); Victor S. Chan, Thornhill (CA); Lev Mirlas, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 1218 days.

(21) Appl. No.: 10/730,543

(22) Filed: Dec. 8, 2003

(65) Prior Publication Data

US 2004/0260623 A1 Dec. 23, 2004

(30) Foreign Application Priority Data

Jun. 17, 2003 (CA) .................................. 2432669

(51) Int. Cl.
 G06Q 30/00 (2006.01)
 H04K 1/00 (2006.01)
(52) U.S. Cl. .................. 705/26; 705/80; 705/37
(58) Field of Classification Search ............... None
See application file for complete search history.

(56) References Cited

U.S. PATENT DOCUMENTS

| | | | |
|---|---|---|---|
| 5,794,207 A | 8/1998 | Walker et al. ......... 705/1 |
| 6,112,189 A * | 8/2000 | Rickard et al. ......... 705/36 R |
| 7,047,227 B2 * | 5/2006 | Batachia et al. ......... 706/60 |
| 7,333,942 B1 * | 2/2008 | Cowles ......... 705/26 |
| 7,373,323 B1 * | 5/2008 | Dalal et al. ......... 705/36 R |
| 2002/0016762 A1 * | 2/2002 | Feilbogen et al. ......... 705/39 |
| 2007/0226084 A1 * | 9/2007 | Cowles ......... 705/27 |

FOREIGN PATENT DOCUMENTS

WO 0070484 5/2000
WO 0073928 5/2000

OTHER PUBLICATIONS

US 2002/0052973 A1, 05/2002, Dines et al. (withdrawn)

* cited by examiner

*Primary Examiner*—F. Zeender
*Assistant Examiner*—Ramsey Refai
(74) *Attorney, Agent, or Firm*—Joseph Bracken Winstead PC

(57) ABSTRACT

An electronic commerce system supports on-line stores that are accessible by a set of buyers. Each buyer is associated with one of a set of one or more organizations. The electronic commerce system includes the ability to define a base trading agreement with terms and conditions for associated buyers and on-line stores, store settings with terms and conditions associated with one of the on-line stores, and customer preferences trading agreements, associated with organizations. The system includes an application interface for returning a set of governing terms and conditions for a buyer-store electronic commerce session, based on the associated base, store settings and customer preferences trading agreements.

3 Claims, 3 Drawing Sheets

E-Commerce System

METHOD AND SYSTEM FOR REFERENCING TRADING AGREEMENTS

PRIORITY BENEFIT AND CROSS REFERENCE TO RELATED APPLICATIONS

This Application claims priority under 35 U.S.C. §119(a) to Canadian Patent Application No. 2,432,669 filed Jun. 17, 2003, which is hereby incorporated herein by reference in its entirety.

TECHNICAL FIELD

The present invention relates generally to electronic commerce web-based systems, and in particular, to referencing models for trading agreements.

BACKGROUND INFORMATION

In an electronic commerce (e-commerce) session, a buyer places orders with a supplier in accordance with a trading agreement. In an e-commerce session, the trading agreement includes terms and conditions that describe specifications for, or limitations on, the business processes that are available to the buyer during the e-commerce session. The business logic of the e-commerce session is governed by the defined set of terms and conditions for the buyer and the supplier for that e-commerce session. Different terms and conditions may apply at different times and for different buyers.

In some situations, it is inefficient to require that the entire set of terms and conditions are specified in a single, uniquely defined, trading agreement for each buyer/supplier interaction. Certain common terms and conditions may be defined for multiple trading agreements. For example, IBM Corporation markets WebSphere Commerce™, which is an electronic commerce system in which a contract may reference another trading agreement (known as a business account) that is defined to be common for a defined buyer organization. Such inclusion by reference allows a "business account" to specify terms and conditions for an entire buyer organization, while a specific trading agreement specifies the terms and conditions for the e-commerce transaction between the individual buyers in that organization and the supplier. In this type of e-commerce system, a buyer organization is expected to have a single business account but many contracts are expected to reference the same business account.

Such an approach, however, may require duplication among the terms and conditions for various organizations. For example, hosted stores in a single e-commerce system may all be governed by a single set of terms and conditions, called a "hosting contract," that must be respected by all trading agreements used by all stores hosted by the e-commerce system. In such a case, each separate business account will contain the same terms and conditions reflecting the hosting contract. Where such hosting contract terms and conditions are modified, each business account for hosted stores will require appropriate alterations.

In e-commerce systems, the management of trading agreements may also become fragmented. Typically, a single trading agreement is structured as a single object. However, it is also common for different users to specify different sets of terms and conditions within that single object. It is potentially unwieldy to allow different participants to edit different subsets of the terms and conditions in the object that defines a trading agreement.

For example, a contract trading agreement typically includes terms and conditions to specify a set of available products and prices covered by the contract. A buyer may wish to further restrict the set of products, and may also seek to restrict the set of permitted payment methods or ship-to addresses. Placing the latter terms and conditions in the contract typically requires involvement of a contract administrator to include the terms in the trading agreement and to manage any modifications as the buyer's needs change. Given a large number of contracts, the contract administrators are required to carry out significant amounts of updating of individual trading agreements.

A further issue arises when an organization setting up an e-commerce web site does not wish to create the entire set of required terms and conditions for each customer. The business model of the organization may require only a limited set of "template" contracts. In such a situation, the definition of a set of terms and conditions for each customer will not be as efficient as asserting that the customer is to be associated with one of a set of template terms and conditions, as modified by some small set of changes to the terms and conditions.

Such templates are disclosed in Patent Cooperation Treaty Patent Application Publication Number WO 00/70484, published Nov. 23, 2000, entitled "A Market Operating System," naming Christopher Jens Cook as inventor. In the Cook reference, a buyer and a seller are able to complete an agreement. The seller is able to access a template for an agreement based on the trade options that the seller specifies. For a given template, the seller will specify the terms that apply for the particular transaction, either by providing the information manually or by selecting from stored options. Such an approach, although utilizing templates to permit reuse of terms, requires the seller to construct a specific agreement for each transaction by selecting from options provided. The Cook reference system therefore requires input by the seller for each transaction.

It is therefore desirable to provide an e-commerce system that permits a flexible and automated definition of terms and conditions for trading agreements that are to govern e-commerce sessions.

SUMMARY OF THE INVENTION

Accordingly, the present invention provides a system and method for improved definition and management of terms and conditions in e-commerce trading agreements governing e-commerce sessions.

An electronic commerce system supports on-line stores accessible by a set of buyers, each buyer having a buyer representation in the electronic commerce system, with each buyer representation being associated with one of a set of one or more organizations. The system defines and maintains (i) a set of customer trading agreement data items, each including terms and conditions associated with one of the set of buyer representations and one or more of the on-line stores, (ii) a set of base trading agreement data items including terms and conditions, each of the base trading agreement data items being available for. reference by one or more of the customer trading agreement data items or one or more of others of the set of base trading agreement data items, (iii) a set of store settings trading agreement data items, each store settings trading agreement data item being associated with one of the on-line stores, and (iv) a set of organization-specific trading agreement data items, each organization-specific trading agreement data item being associated with one of the set of organizations. The system also implements an application interface for returning a set of governing terms and conditions for a buyer-store electronic commerce session, based. on the referenced customer, base, store settings and organization-specific trading agreement data items.

According to an aspect of the present invention, there is provided an application interface for returning a set of governing terms and conditions that determines the set of governing conditions for the buyer-store electronic commerce session by taking the union set of the terms and conditions specified in the customer trading agreement data item for the buyer-store electronic commerce session, any base trading agreement data items referenced by the customer trading agreement data item and by other referenced base trading agreements, any store settings trading agreement data items for the store of the buyer-store electronic commerce session, and any organization-specific trading agreement data items for the ancestor organizations to the buyer representation in the buyer-store electronic commerce session.

The present invention thus improves the ability to specify terms and conditions for e-commerce sessions. The approach of the invention permits a single infrastructure to control the business logic that governs the sessions and define trading agreements in a flexible way.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
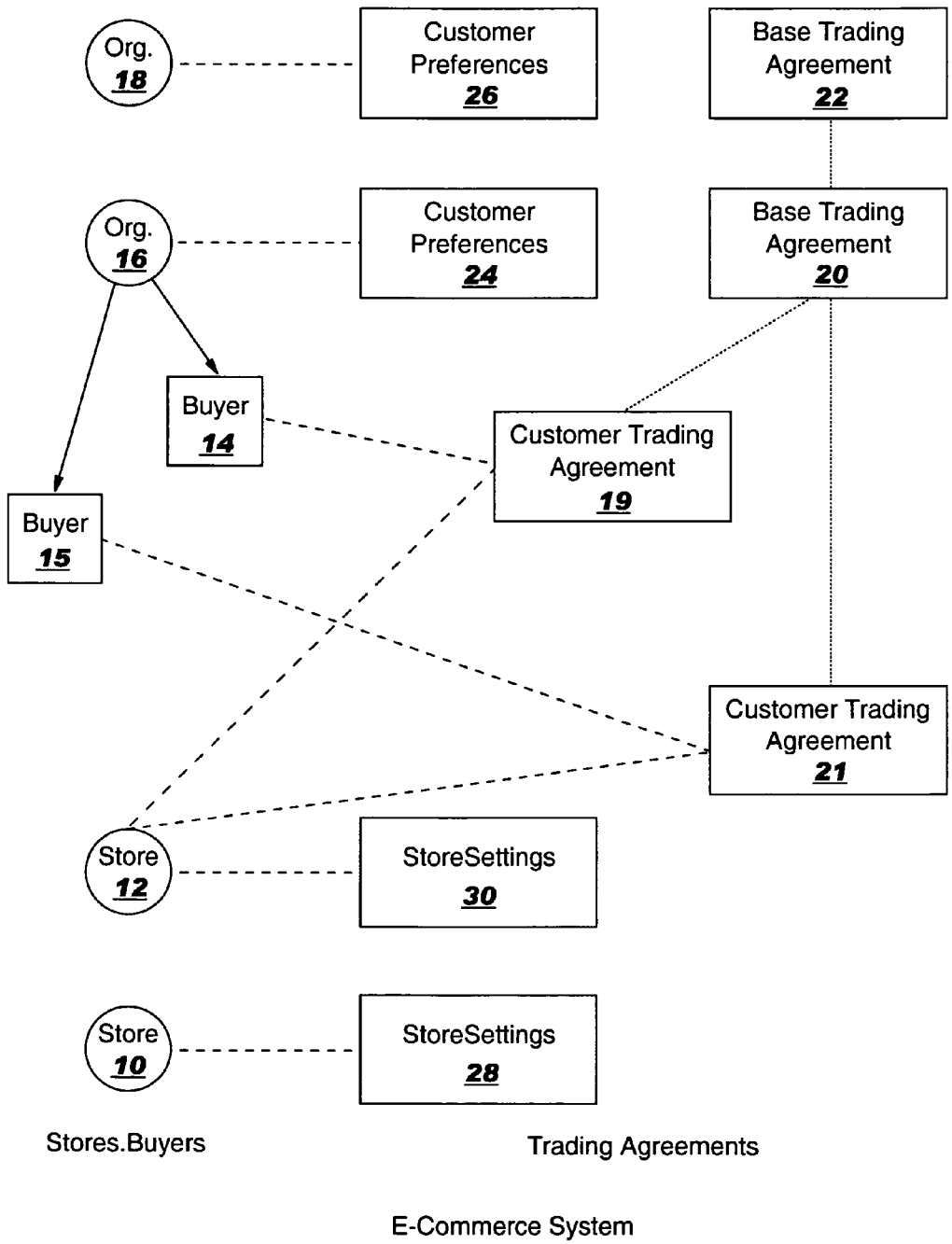
FIG. 1 is a block diagram showing an exemplary configuration of an e-commerce system in accordance with an embodiment of the present invention.

In the following description, numerous specific details are set forth such as specific network configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention may be used to define e-commerce web sites, and allows users to define e-commerce stores accessible to buyers. A simplified example configuration of a set of e-commerce web sites, and associated data structures, defined by an e-commerce system in accordance with an embodiment of the invention is shown in the block diagram of FIG. 1. The system permits the development of web sites implementing on-line stores that are accessible to buyers. The example in FIG. 1 shows stores 10, 12. Buyers are registered in the e-commerce system and a buyer representation is defined in the system. Buyers represented in the e-commerce system are each associated with one of a set of organizations, also represented in the e-commerce system. The example of FIG. 1 shows buyers 14, 15 associated with organization 16 that is, in turn, associated with organization 18. As FIG. 1 shows, organizations may be defined to be parents or children of other organizations.

A buyer will interact with a store in a way that is defined in part by a set of terms and conditions. The terms and conditions for the buyer-store interaction are defined dynamically based on a set of trading agreements that are defined in the e-commerce system. In effect, when a buyer accesses a store web site, a governing set of terms and conditions is defined. A trading component provides applications with a set of interfaces to permit the look up of relevant terms and conditions for the governing trading agreement. The description below sets out how this set of governing terms and conditions is generated, using the example of FIG. 1.

There is a customer trading agreement definable for each buyer and there are three types of trading agreements potentially defined and accessible to allow the system to generate a governing set of terms and conditions. These three types of accessible agreements are 1) Base trading agreements, 2) Customer Preference, and 3) Store Settings.

For each buyer-store combination, there is a customer trading agreement specified. This agreement contains terms and conditions used to define the governing terms and conditions of the trading arrangement between the buyer and the store the buyer is deal with. In the example of FIG. 1, customer trading agreement 19 is a customer trading agreement specified for buyer 14 and store 12. A customer trading agreement may refer to base trading agreements. FIG. 1 shows customer trading agreement 19 referencing base trading agreement 20. Similarly, the interaction between buyer 15 and store 12 is subject to customer trading agreement 21, which also references base trading agreement 20. Base trading agreement 20, in turn, references base trading agreement 22. The union of the terms and conditions of trading agreements 19, 20, 22 is calculated, and this union is part of what is used in determining the governing terms and conditions for buyer 14 and store 12. Similarly, the union of terms and conditions in trading agreements 21, 20, 22 are partially determinative of the governing terms and conditions for buyer 15 using store 12.

As will be described below, the set union operator is used for the different sets of terms and conditions that are defined as potentially influencing the governing terms and conditions for a buyer and store in the e-commerce system. As is also referred to, there are also a number of conflict rules that may be implemented in the e-commerce system to avoid incompatible terms and conditions being included in the governing set. Apart from these conflict rules, the approach is to take the union of all terms and conditions.

The second type of terms and conditions that are definable are customer preference terms and conditions. These are definable for different organizations represented in the e-commerce system. The simple example of FIG. 1 shows customer preferences 24, 26 defined in association with organizations 16, 18, respectively. The customer preference terms and conditions are determined by finding all customer preference trading agreements for all organizations which are parents of the organization with which the buyer is associated, and returning the union of all terms and conditions in those trading agreements. It will be noted that each set of customer preference terms and conditions are specific to a defined organization. The customer preference terms and conditions are defined by accessing all parent organizations of the organization to which the buyer belongs. However, other implementations may access only a defined subset of the parent organizations to determine the applicable terms and conditions.

The third type of terms and conditions are those in the store settings for the store in question. In the example implementation of FIG. 1, store 10 has associated store settings 28 and store 12 has associated store settings 30. The store settings are terms and conditions that are intended to apply to all transactions carried out at the store's web site. Thus, the terms and conditions defined in store settings 28 are automatically appended to all contracts and other trading agreements for store 10.

Examples of the types of customer preferences terms and conditions include:
  acceptable ship-to addresses
  acceptable shipping modes
  acceptable payment methods
  product catalog inclusions and exclusions The types of terms and conditions definable for store settings may include these same terms and conditions that are definable for the customer preferences.

As may be seen from this description and the further detail set out below, the approach of an embodiment allows a single infrastructure to be used to define the business logic for different stores, organizations, and buyers. The custom business logic required in other systems is not required in the system. The governing terms and conditions for a transaction are determined by querying the appropriate customer trading agreement. The result of the query will be the system carrying out steps so that the entire set of governing terms and conditions are returned. While an appropriate application simply calls an interface to look up a set of terms and conditions for the customer trading agreement, the implementation of the interface looks for terms and conditions in the three other types of trading agreements, as referred to above. This is seen with reference to the flowchart of FIG. 2.

In the system, it is possible to query the appropriate customer trading agreement for terms and conditions of a defined type. For example, payment terms and conditions or shipping terms and conditions may be separately queried for. The steps shown in FIG. 2 may be carried out for terms and conditions of a defined type only, or for the entire set of terms and conditions.

Figure 2:
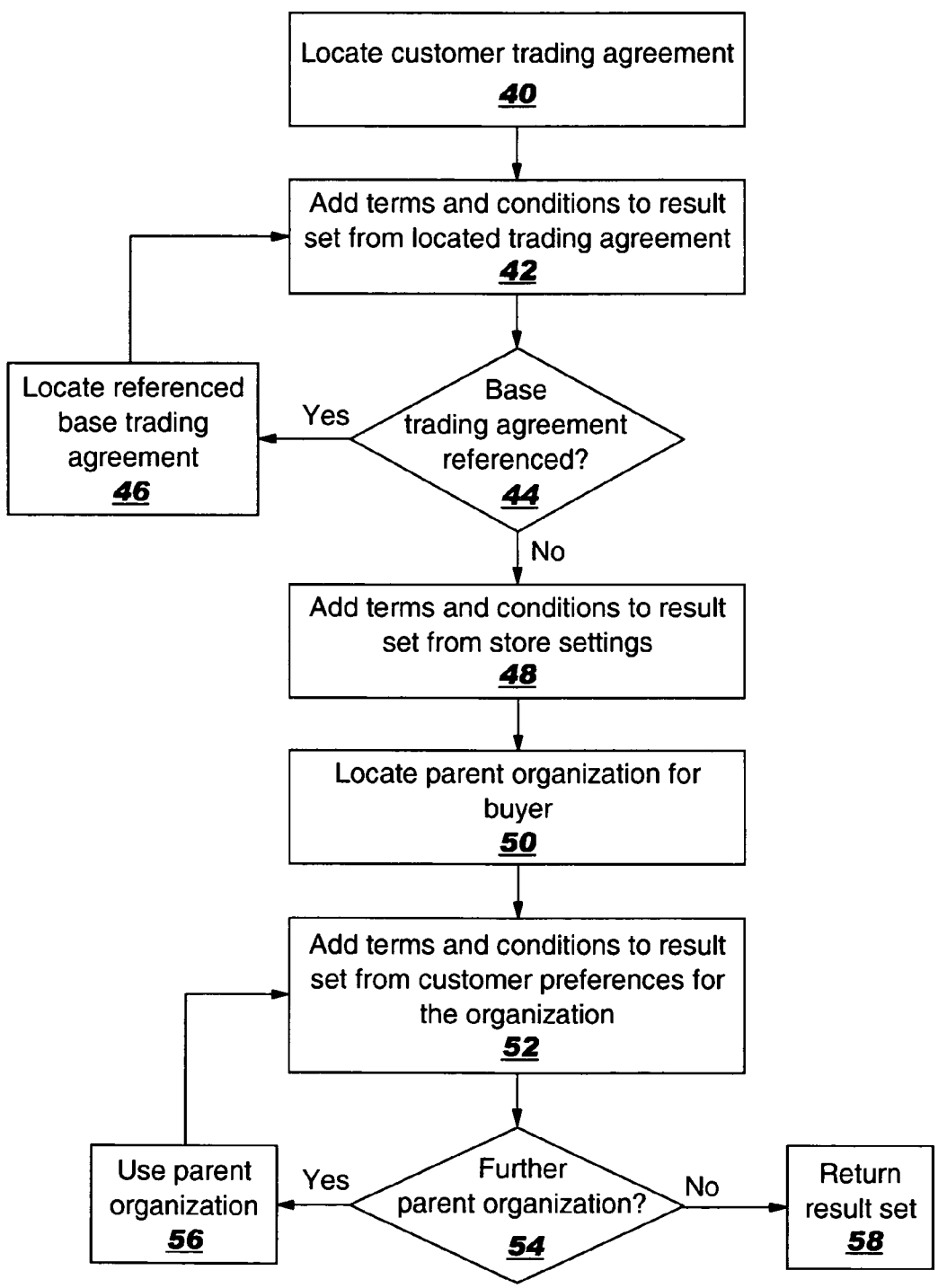
FIG. 2 is a flowchart showing steps taken in accordance with an embodiment of the present invention.

The steps shown in FIG. 2 are followed in the lookup interface to find such governing terms and conditions for the interaction between a buyer and a store:

1. The system initially looks up terms and conditions, for the requested trading agreement, by locating the customer trading agreement (step 40);

2. Terms and conditions from the located trading agreement are added to a result set (step 42);

3. The agreement is checked for a referencing term in the trading agreement (decision step 44). If so, the referenced base trading agreement is located (step 46) and step 2 is repeated;

4. In the case where the store has a "store settings" trading agreement, its terms and conditions are added to the result set (step 48);

5. The parent organization of the buyer is located (step 50);

6. A check determines whether the parent organization has a "customer preferences" trading agreement. If the parent organization does have a customer preferences trading agreement, then the terms and conditions are added to the result set (step 52).

7. Whether there is a parent for the current organization is determined (decision step 54). If there is, find that parent organization, and repeat step 6 above (step 56).

8. Return the result set of terms and conditions to the application (step 58).

Caching techniques may be used to improve performance. For example:
  all store setting trading agreements are cached in memory; and
  a lazy-fetch cache of relationships between trading agreements is implemented. Thus, once a trading agreement is found to reference another trading agreement, this referencing relationship is kept in memory. This way, in step (3) above, before looking for a referencing base trading agreement, the cache is checked first, to see whether this trading agreement already is known to reference another trading agreement. If an entry exists indicating the referenced trading agreement, then that trading agreement is used. If an entry exists in the cache indicating that this trading agreement does not reference any other trading agreements, then a trading agreement reference is no longer looked for. A search for a trading agreement reference only continues if no cache entry exists for the requested trading agreement.

It is expected that in most implementations of e-commerce web sites defined using the system, there will be fewer referenced base trading agreements than base trading agreements that are directly related to a buyer-store session. Therefore, it is desirable to have a separate cache of all referenced trading agreements and their terms and conditions, from the cache of requested trading agreements and their terms and conditions.

The above description refers to the union of terms being taken to give a result set of governing terms and conditions. However, in the system it is possible to define conflict rules to prevent the union operation giving a result set that includes inconsistent terms and conditions. Such rules are defined in an implementation-specific manner. The system permits such conflict rules to be defined to avoid defined inconsistent terms.

In the description above, there are store settings trading agreements and customer preferences trading agreements that are definable by the system. The system may be extended to include other entities that potentially influence the terms and conditions of the buyer-store interaction. For example, the system may be extended to include representations of laws and regulations for different jurisdictions. The system may include terms and conditions that the local laws of a jurisdiction include in buyer contracts. Such additional terms and conditions may be dealt with in the manner set out above for customer preferences trading agreements.

The example of terms and conditions mandated by laws and regulations may be implemented by including the local jurisdiction as an organization in the hierarchy of organizations to which a buyer belongs. Alternatively, the system may be extended to include a separate set of legal jurisdiction organizations that have related terms and conditions which are represented in the system and which are accessed to determine governing terms and conditions for a buyer-store interaction. In the latter case, the system will be modified to access the defined terms and conditions for the relevant local jurisdiction as part of the steps in determining the governing terms and conditions. These types of terms and conditions are, like the customer preferences terms and conditions referred to above, organization-specific.

Figure 3:
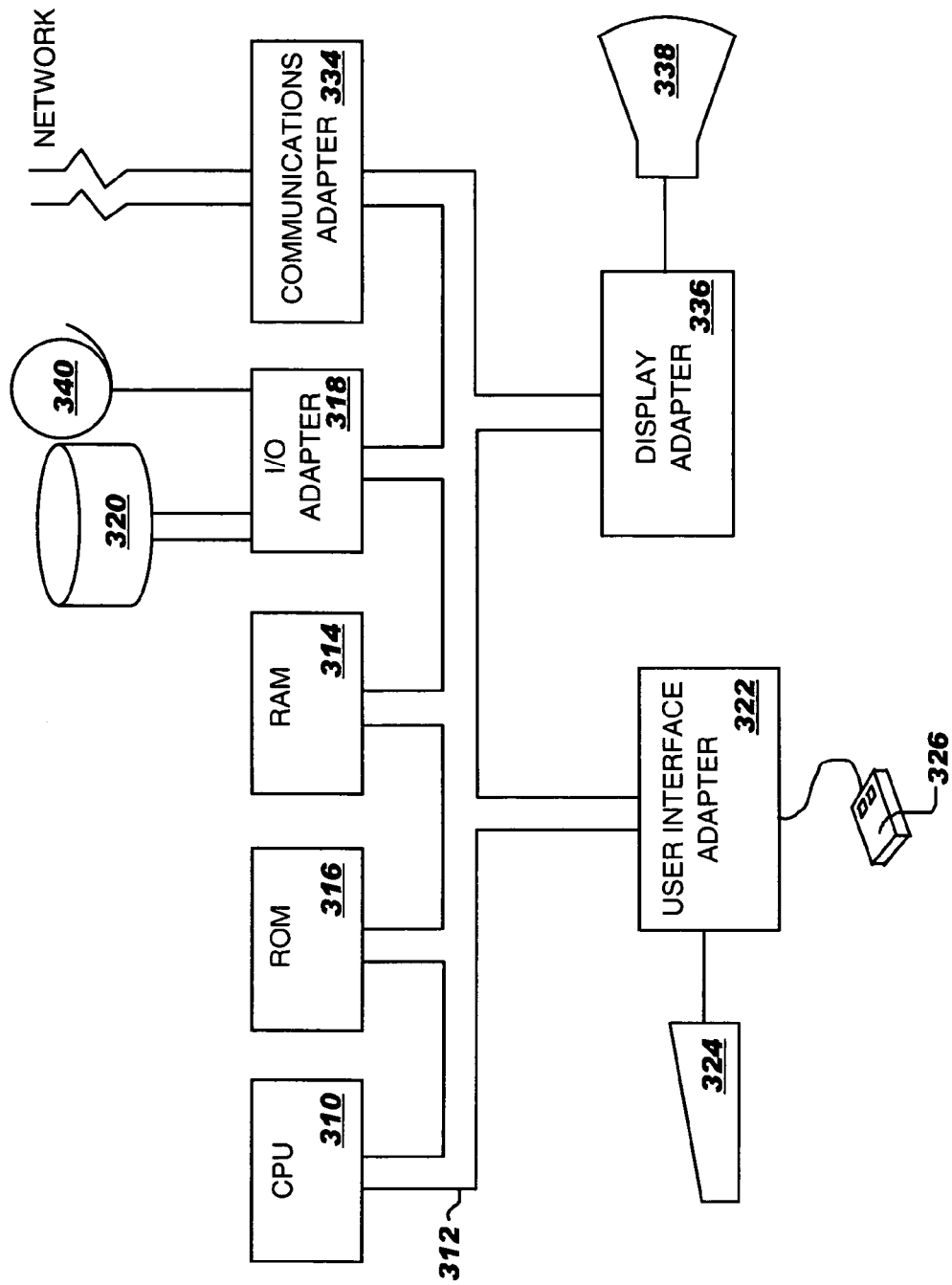
FIG. 3 is a block diagram of a data processing system configured in accordance with embodiments of the present invention.

Referring to FIG. 3, an example is shown of a data processing system 300 which may be used to implement the processes described herein, and any of the hardware used to implement the processes. The system has a central processing unit (CPU) 310, which is coupled to various other components by system bus 312. Read only memory ("ROM") 316 is coupled to the system bus 312 and includes a basic input/output system ("BIOS") that controls certain basic functions of the data processing system 300. Random access memory ("RAM") 314, I/O adapter 318, and communications adapter 334 are also coupled to the system bus 312. I/O adapter 318 may be a small computer system interface ("SCSI") adapter that communicates with a disk storage device 320. Communications adapter 334 interconnects bus 312 with an outside network enabling the data processing system to communicate with other such systems. Input/Output devices are also connected to system bus 312 via user interface adapter 322 and display adapter 336. Keyboard 324 and speaker 328 are all interconnected to bus 312 via user interface adapter 322. Display monitor 338 is connected to system bus 312 by display adapter 336. In this manner, a user is capable of inputting to the system throughout the keyboard 324, or mouse 326 and receiving output from the system via display 338.

Implementations of the invention include implementations as a computer system programmed to execute the method or methods described, herein, and as a computer program product. According to the computer system implementation, sets of instructions for executing the method or methods may be resident in the random access memory 314 of one or more computer systems configured generally as described above. Until required by the computer system, the set of instructions may be stored as a computer program product in another computer memory, for example, in disk drive 320 (which may include a removable memory such as an optical disk or floppy disk for eventual use in the disk drive 320). While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A computer program product for implementing an electronic commerce system supporting on-line stores accessible by a set of buyers, each buyer having a buyer representation in the electronic commerce system, each buyer representation being associated with one of a set of one or more organizations, the computer program product comprising a computer usable medium having computer readable program code means embodied in said medium, and comprising:

computer readable program code means for defining and maintaining a set of customer trading agreement data items, each comprising terms and conditions associated with one of the set of buyer representations and one or more of the on-line stores;

computer readable program code means for defining and maintaining a set of base trading agreement data items comprising terms and conditions, each of the base trading agreement data items being available for reference by one or more of the customer trading agreement data items or one or more of others of the set of base trading agreement data items;

computer readable program code means for defining and maintaining a set of store settings trading agreement data items, each store settings trading agreement data item being associated with one of the on-line stores;

computer readable program code means for defining and maintaining a set of organization-specific trading agreement data items, each organization-specific trading agreement data item being associated with one of the set of organizations; and computer readable program code means for implementing an application interface for returning a set of governing terms and conditions for a buyer-store electronic commerce session, based on the referenced customer, base, store settings and organization-specific trading agreement data items;

in which the application interface for returning a set of governing terms and conditions determines the set of governing conditions for the buyer-store electronic commerce session by taking the union set of the terms and conditions specified in the following trading agreements, where such agreements are defined to comprise:

a. the customer trading agreement data item for the buyer-store electronic commerce session, b. the base trading agreement data items referenced by the customer trading agreement data item and by other referenced base trading agreements, c. the store settings trading agreement data items for the store of the buyer-store electronic commerce session, and d. the organization-specific trading agreement data items for the ancestor organizations to the buyer representation in the buyer-store electronic commerce session;

in which the application interface for returning a set of governing terms and conditions determines the set of governing terms and conditions for the buyer-store electronic commerce session by applying a set of conflict rules to the set of the terms and conditions in the union set of the said trading agreements.

2. An electronic commerce system supporting on-line stores accessible by a set of buyers, each buyer having a buyer representation in the electronic commerce system, each buyer representation being associated with one of a set of one or more organizations, the system comprising:

means for defining and maintaining a set of customer trading agreement data items, each comprising terms and conditions associated with one of the set of buyer representations and one or more of the on-line stores;

means for defining and maintaining a set of base trading agreement data items comprising terms and conditions, each of the base trading agreement data items being available for reference by one or more of the customer trading agreement data items or one or more of others of the set of base trading agreement data items;

means for defining and maintaining a set of store settings trading agreement data items, each store settings trading agreement data item being associated with one of the on-line stores; means for defining and maintaining a set of organization-specific trading agreement data items, each organization-specific trading agreement data item being associated with one of the set of organizations; and an application interface for returning a set of governing terms and conditions for a buyer-store electronic commerce session, based on the referenced customer, base, store settings and organization-specific trading agreement data items;

in which the application interface for returning a set of governing terms and conditions determines the set of governing conditions for the buyer-store electronic commerce session by taking the union set of the terms and conditions specified in the following trading agreements where such agreements are defined to comprise:

the customer trading agreement data item for the buyer-store electronic commerce session;

the base trading agreement data items referenced by the customer trading agreement data item and by other referenced base trading agreements;

the store settings trading agreement data items for the store of the buyer-store electronic commerce session; and the organization-specific trading agreement data items for the ancestor organizations to the buyer representation in the buyer-store electronic commerce session; in which the application interface for returning a set of governing terms and conditions determines the set of governing terms and conditions for the buyer-store electronic commerce session by applying a set of conflict rules to the set of the terms and conditions in the union set of the said trading agreements.

3. A computer-implemented method for defining governing terms and conditions for a transaction in an electronic commerce system, the system supporting on-line stores accessible by a set of buyers, each buyer having a buyer representation in the electronic commerce system, each buyer representation being associated with one of a set of one or more organizations, the method comprising the steps of:

defining and maintaining a set of customer trading agreement data items, each comprising terms and conditions associated with one of the set of buyer representations and one or more of the on-line stores;

defining and maintaining a set of base trading agreement data items comprising terms and conditions, each of the base trading agreement data items being available for reference by one or more of the customer trading agreement data items or one or more of others of the set of base trading agreement data items;

defining and maintaining a set of store settings trading agreement data items, each store settings trading agreement data item being associated with one of the on-line stores;

defining and maintaining a set of organization-specific trading agreement data items each organization-specific trading agreement data item being associated with one of the set of organizations; and determining the governing terms and conditions for the buyer-store electronic commerce session for the said transaction, based on any referenced customer, base, store settings and organization-specific trading agreement data items;

in which the step of determining the governing terms and conditions comprises the step of taking the union set of the terms and conditions specified in the trading agreements defined to comprise:

the customer trading agreement data item for the buyer-store electronic commerce session;

the base trading agreement data items referenced by the customer trading agreement data item and by other referenced base trading agreements;

the store settings trading agreement data items for the store of the buyer-store electronic commerce session; and the organization-specific trading agreement data items for the ancestor organizations to the buyer representation in the buyer-store electronic commerce session;

in which the step of returning a set of governing terms and conditions further comprises the step of applying a set of conflict rules to the set of the terms and conditions in the union set of the said trading agreements.

\* \* \* \* \*